(12) United States Patent
Taguchi et al.

(10) Patent No.: US 9,698,408 B2
(45) Date of Patent: Jul. 4, 2017

(54) SECONDARY BATTERY

(71) Applicant: Automotive Energy Supply Corporation, Zama-shi, Kanagawa (JP)

(72) Inventors: Hiromoto Taguchi, Zama (JP); Aika Kimura, Zama (JP); Noriyasu Onodera, Zama (JP); Koichi Shinohara, Zama (JP); Shinichiro Sakaguchi, Zama (JP)

(73) Assignee: AUTOMOTIVE ENERGY SUPPLY CORPORATION, Zama-Shi, Kanagawa (JP)

( * ) Notice: Subject to any disclaimer, the term of this patent is extended or adjusted under 35 U.S.C. 154(b) by 0 days.

(21) Appl. No.: 14/896,003

(22) PCT Filed: Jun. 14, 2013

(86) PCT No.: PCT/JP2013/066475
§ 371 (c)(1),
(2) Date: Dec. 4, 2015

(87) PCT Pub. No.: WO2014/199513
PCT Pub. Date: Dec. 18, 2014

(65) Prior Publication Data
US 2016/0133910 A1    May 12, 2016

(51) Int. Cl.
*H01M 2/30* (2006.01)
*H01M 10/0585* (2010.01)
(Continued)

(52) U.S. Cl.
CPC ............... *H01M 2/30* (2013.01); *H01M 2/06* (2013.01); *H01M 2/08* (2013.01); *H01M 2/26* (2013.01);
(Continued)

(58) Field of Classification Search
CPC ...... H01M 2/30; H01M 10/0585; H01M 2/08; H01M 2/26; H01M 10/0436; H01M 2/06
See application file for complete search history.

(56) References Cited

U.S. PATENT DOCUMENTS

2001/0051298 A1* 12/2001 Hanafusa ............ H01M 2/0207
429/162
2002/0146621 A1* 10/2002 Yageta .................... C23C 22/36
429/181
(Continued)

FOREIGN PATENT DOCUMENTS

| | | |
|---|---|---|
| CN | 101032043 A | 9/2007 |
| JP | 2001-093489 A | 4/2001 |

(Continued)

OTHER PUBLICATIONS

International Search Report mailed Sep. 3, 2013 issued in corresponding PCT Application No. PCT/JP2013/066475.
(Continued)

*Primary Examiner* — Stewart Fraser
(74) *Attorney, Agent, or Firm* — Troutman Sanders LLP

(57) ABSTRACT

A secondary battery has a flat shape and houses a power generation element together with an electrolyte solution inside an exterior body. A terminal includes: a terminal main body including a nickel plane containing nickel on at least a surface thereof; an anticorrosive layer covering at least a part of the nickel plane that is more on the inside of the exterior body than a held portion; and a resin layer covering at least the held portion of a surface of the anticorrosive layer and having an internal extension portion extending from the held portion to the inside of the exterior body.

20 Claims, 4 Drawing Sheets

(51) Int. Cl.
*H01M 2/06* (2006.01)
*H01M 10/04* (2006.01)
*H01M 2/08* (2006.01)
*H01M 2/26* (2006.01)

(52) U.S. Cl.
CPC ... *H01M 10/0436* (2013.01); *H01M 10/0585* (2013.01)

(56) References Cited

U.S. PATENT DOCUMENTS

| | | | |
|---|---|---|---|
| 2008/0254360 A1 | 10/2008 | Miyazawa et al. | |
| 2013/0017438 A1* | 1/2013 | Taguchi | H01G 11/06 429/179 |
| 2013/0034772 A1* | 2/2013 | Yoshida | H01M 2/029 429/178 |

FOREIGN PATENT DOCUMENTS

| | | | |
|---|---|---|---|
| JP | 2001-196094 A | 7/2001 | |
| JP | 2006-128096 A | 5/2006 | |
| JP | 2009-099527 A | 5/2009 | |
| JP | 2009-110812 A | 5/2009 | |
| JP | 2010-027368 A | 2/2010 | |
| JP | 2011-023221 A | 2/2011 | |
| JP | 2011-181300 A | 9/2011 | |
| JP | 2011216343 A | 10/2011 | |
| JP | 2013-012468 A | 1/2013 | |

OTHER PUBLICATIONS

Extended European Search Report dated Apr. 11, 2016, issued in corresponding European Patent Application No. 13886955.7.

* cited by examiner

SECONDARY BATTERY

CROSS-REFERENCE TO RELATED APPLICATION

This application is a U.S. National Phase Application under 35 U.S.C. §371 of International Patent Application No. PCT/JP2013/066475 filed Jun. 14, 2013, the entire contents of which are hereby incorporated herein by reference.

TECHNICAL FIELD

The present invention relates to a flat secondary battery with a laminated film as an exterior body, and particularly to a structure thereof including a terminal connected to a power generation element inside the battery.

BACKGROUND ART

One of the known secondary batteries has a laminated film, which is a metal layer with a surface thereof laminated with a synthetic resin layer, used as an exterior body, has a power generation element including a plurality of stacked positive electrode plates, negative electrode plates, and separators housed therein together with an electrolyte solution, and has a flat shape (for example, Patent Literature 1).

A known example of a terminal (a terminal of a positive or negative electrode) for extracting current out of the power generation element inside this type of secondary battery is a terminal including a nickel layer formed on a surface of a terminal main body including a conductive material such as copper (for example, a nickel plated layer). For sealing the exterior body with the power generation element and the like housed therein, the terminal to be applied is held by the exterior body and the held portion is sealed.

The sealing of the held portion is conducted by a known method as below. In this method, a heat-seal resin layer is formed in advance in the portion where the terminal surface (nickel layer surface) is held. Through the resin layer, the terminal is held by the exterior body. The held portion is then heat-sealed. In another known method, an anticorrosive layer is formed to cover the surface of the nickel layer in the terminal, which will be in contact with the electrolyte solution in the exterior body, for preventing the corrosion, the elusion, and the like due to the contact with the electrolyte solution. It is considered that the force of peeling due to the internal pressure in the exterior body operates on the held portion.

An object of the present invention is to provide a secondary battery with higher reliability while improving the peeling strength between the terminal and the exterior body.

CITATION LIST

Patent Literature

Patent Literature 1: JP-A-2009-99527

SUMMARY OF INVENTION

The present invention was made in view of the above technical problem. Specifically, a flat secondary battery according to one embodiment of the present invention includes: a power generation element including a positive electrode plate and a negative electrode plate stacked with a separator interposed between the plates; an exterior body housing the power generation element and an electrolyte solution together and sealed by a laminated film having a resin layer stacked on at least an inner surface of a metal layer; and a terminal having one end connected to the power generation element and the other end led out of the exterior body, held by the exterior body between the one end and the other end, and having a held portion, which is held by the exterior body, being sealed. The terminal includes a terminal main body including nickel on at least a surface side thereof, an anticorrosive layer covering at least a part of the surface of the terminal main body that is more on the inside of the exterior body than the held portion, and a resin layer covering at least the held portion of a surface of the anticorrosive layer and having an internal extension portion extending from the held portion to the inside of the exterior body. The held portion is sealed by heat-sealing the resin layer and the resin layer on an inner surface of the exterior body.

The internal extension portion may extend from the held portion to the inside of the exterior body by 0.5 mm to 5 mm. The exterior body may be sealed under reduced pressure. A liquid volume coefficient, which is described later, of the electrolyte solution housed in the exterior body may be 1.1 to 1.6. The power generation element and the terminal may be bonded to each other through a connection portion interposed between the power generation element and the terminal. The thickness of bonded portion of the power generation element and the terminal after the bonding may be larger than the thickness of the internal extension portion.

DESCRIPTION OF EMBODIMENTS

An example of a secondary battery according to an embodiment of the present invention is described below.

Structure Example of Secondary Battery

Figure 1:
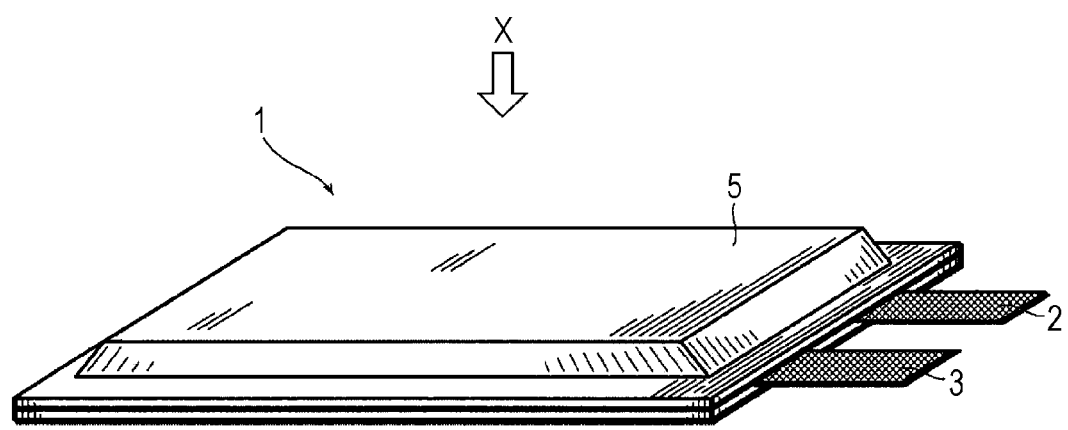
FIG. 1 is a schematic perspective view for describing an example of a secondary battery according to the present invention.
Figure 2:
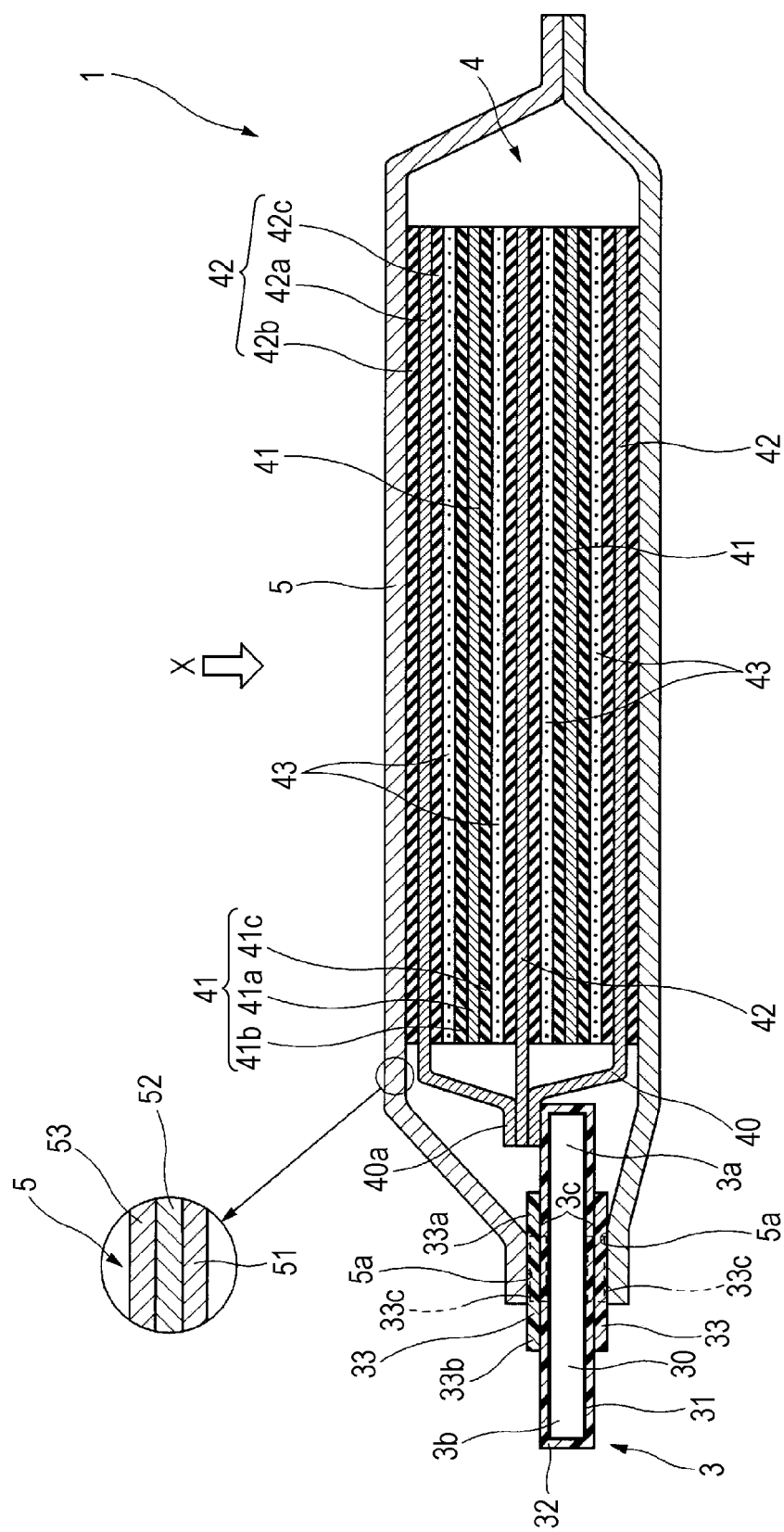
FIG. 2 is a schematic sectional view of the secondary battery illustrated in FIG. 1.
Figure 3:
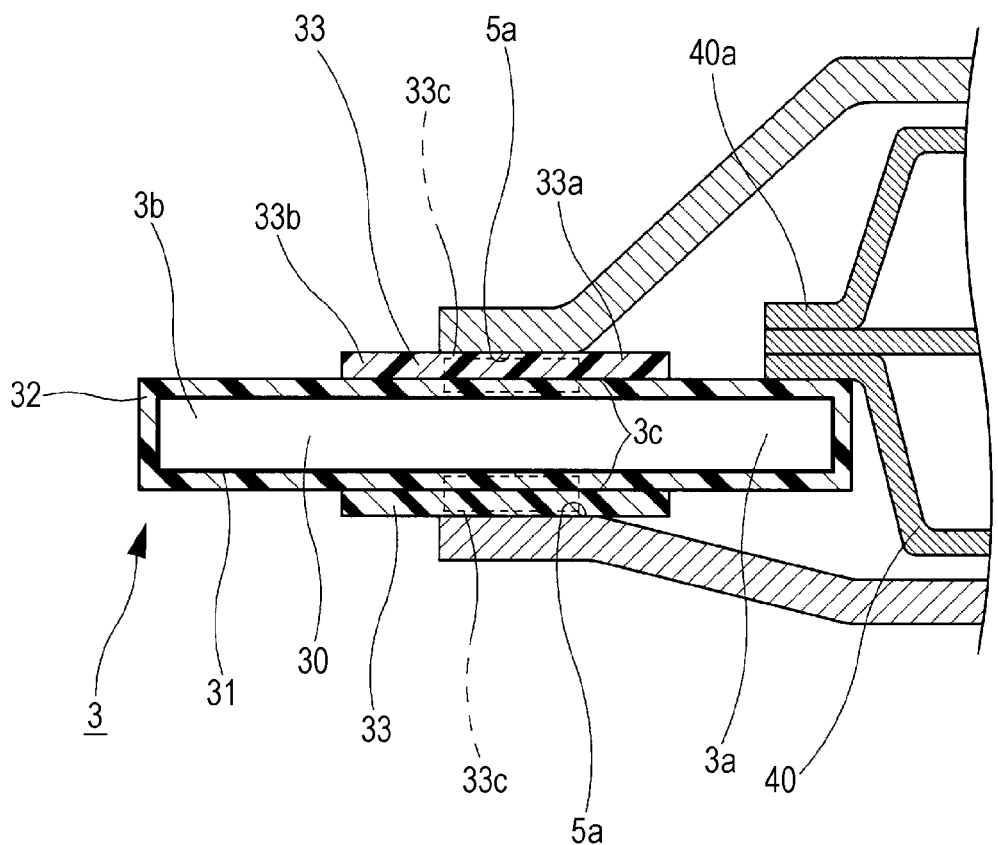
FIG. 3 is a schematic explanatory view in which the terminal portion illustrated in FIG. 2 is magnified.

A secondary battery illustrated in FIGS. 1 to 3 corresponds to, for example, a lithium ion secondary battery 1. As illustrated in FIG. 1, the external shape of the battery is flat and rectangular. One edge thereof in a long-side direction is provided with a pair of terminals 2 and 3.

As illustrated in FIG. 2, the lithium ion secondary battery 1 has a power generation element 4 with a rectangular shape in an arrow X direction housed in an exterior body 5 together with an electrolyte solution. The power generation element 4 includes a plurality of positive electrode plates 41 and negative electrode plates 42 alternately stacked with a separator 43 interposed therebetween. For example, the power generation element 4 includes three negative electrode plates 42, two positive electrode plates 41, and four separators 43 held therebetween. In this example, the negative electrode plate 42 is disposed at the outermost layer of the power generation element 4. The power generation element 4 can alternatively be configured to have the positive electrode plate 41 at the outermost layer. The dimension of each component in FIG. 2 may not be exactly correct because the dimension may be exaggerated for the explanation.

The positive electrode plate 41 has a positive electrode active material layer 41b formed on one surface of a positive electrode current collector 41a with a rectangular shape in an arrow X direction in FIGS. 1 and 2, and has a positive electrode active material layer 41c formed on the other surface of the positive electrode current collector 41a. The positive electrode current collector 41a includes, for example, a metal foil that is electrochemically stable, such as an aluminum foil or an aluminum alloy foil. The positive electrode active material layers 41b and 41c are each formed by, for example, applying on a main plane of the positive electrode current collector 41a, a mixture including a binder and a positive electrode active material containing a lithium composite oxide such as lithium nickelate ($LiNiO_2$), lithium manganate ($LiMnO_2$), or lithium cobaltate ($LiCoO_2$).

The negative electrode plate 42 has a negative electrode active material layer 42b formed on one surface of a negative electrode current collector 42a with a rectangular shape in the arrow X direction in FIGS. 1 and 2, and has a negative electrode active material layer 42c formed on the other surface of the negative electrode current collector 42a. The negative electrode current collector 42a includes, for example, a metal foil that is electrochemically stable, such as a copper foil, a stainless steel foil, or an iron foil. The negative electrode active material layers 42b and 42c are each formed by, for example, applying on a main plane of the negative electrode current collector 42a, a mixture including a binder and a negative electrode active material that intercalates or deintercalates lithium ions, such as amorphous carbon, non-graphitizable carbon, graphitizable carbon, or graphite.

An end of the negative electrode current collector 42a in the long-side direction has a part thereof extending as an extension portion (corresponding to a connection portion according to the present invention) 40 having neither the negative electrode active material layer 42b nor 42c. A tip portion 40a of the extension portion 40 is bonded to an end 3a of a negative electrode terminal 3 inside the exterior body 5. If the number of negative electrode current collectors 42a is more than one, the tip portions 40a of the extension portions 40 of these negative electrode current collectors 42a are collected and bonded integrally.

The bonding may be conducted by a method of, for example, ultrasonic bonding (in which an ultrasonic horn is brought into contact with the tip portion 40a for bonding) performed with the tip portion 40a of the extension portion 40 in contact with the end 3a of the negative electrode terminal 3. Although not illustrated in FIG. 2, an end of the positive electrode current collector 41a in the long-side direction similarly has a part thereof extending as an extension portion (corresponding to a connection portion according to the present invention, which is not shown) having neither the positive electrode active material layer 41b nor 41c. A tip portion of the extension portion thereof is bonded to an end of a positive electrode terminal 2 inside the exterior body 5.

The separator 43 has a function of preventing the short-circuiting between the positive electrode plate 41 and the negative electrode plate 42 and of holding the electrolyte. For example, the separator 43 is formed of a microporous film containing polyolefin such as polyethylene (PE) or polypropylene (PP). The separator 43 is not limited to a single-layer film of polyolefin. A separator with a three-layer structure with a polypropylene film sandwiched between polyethylene films, or a separator including a polyolefin microporous film and an organic nonwoven fabric that are stacked may be used.

The exterior body 5 has the power generation element 4 including the stacked electrode plates and separators, and the electrolyte solution housed therein. As illustrated in the magnified drawing in FIG. 2, the exterior body 5 includes a laminated film with a three-layer structure of a heat-seal layer 51, a metal layer 52, and a protective layer 53. The metal layer 52 as the intermediate layer may be, for example, an aluminum foil. The heat-seal layer 51 covering the internal surface of the metal layer 52 may include, for example, a synthetic resin capable of heat-sealing, such as polypropylene (PP). The protective layer 53 covering the external surface of the metal layer 52 may include, for example, a synthetic resin with excellent durability, such as polyethylene terephthalate (PET). A laminated film with more layers may alternatively be used. In the example above, each surface of the metal layer 52 is laminated with the synthetic resin layer but the synthetic layer on the outside of the metal layer 52 may be omitted. The exterior body 5 may be configured to have the synthetic resin layer only on the internal surface thereof.

In one example, the exterior body 5 has a two-sheet structure including one laminated film disposed on the bottom side of the power generation element 4 in FIG. 2 and another laminated film disposed on the top side thereof. The exterior body 5 is configured to have four sides of these two laminated films placed on each other and heat-sealed. In the illustrated example, the exterior body 5 has the two-sheet structure. In another example, the exterior body 5 employs one relatively large laminated film, which is folded and has the power generation element 4 disposed on the inside of the folded laminated film. The film has three sides around the power generation element 4 placed on each other and heat-sealed.

The pair of terminals 2 and 3 is disposed on the short side of the lithium ion secondary battery 1 with the rectangular shape. Through the heat-sealing of the laminated film, the ends of these terminals (in the case of the negative electrode terminal 3, the end 3a) are bonded to the extension portions of the current collector 41a and the current collector 42a (in the case of the current collector 42a, the extension portion 40). In this state, the other ends of these terminals (in the case of the negative electrode terminal 3, the other end 3b) are extracted through bonding surfaces 5(a) of the laminated films to the outside of the exterior body 5. The pair of terminals 2 and 3 is held by the bonding surfaces 5(a) of the laminated films of the exterior body 5 between one end and the other end (in the case of the negative electrode terminal 3, one end 3a and the other end 3b). The exterior body 5 is sealed in a held portion 33c at which the terminal is held.

Example of Terminal

The negative electrode terminal 3 includes, for example, nickel at least on the surface side as illustrated in FIGS. 2 and 3. The negative electrode terminal 3 includes a terminal main body 30 with a nickel plane 31, an anticorrosive layer 32 covering at least a part of the nickel plane 31 of the terminal main body 30 that is more on the inside of the exterior body 5 than the held portion 33c, and a resin layer 33 covering at least the held portion 33c of the surface of the anticorrosive layer 32 and having an internal extension portion 33a extending from the held portion 33c to the inside of the exterior body 5.

The terminal main body 30 has the nickel plane 31 as described above. For example, a terminal main body formed of a rectangular conductor can be used. Examples thereof include a terminal main body including nickel metal and a terminal main body including metal such as copper with a surface plated with nickel.

The anticorrosive layer 32 may be, for example, an anticorrosive layer formed by chemically treating the nickel plane 31 of the terminal main body 30. The anticorrosive layer 32 prevents the nickel plane 31 from being exposed to the electrolyte solution. For example, the corrosion due to hydrogen fluoride can be suppressed. In an extension portion covered surface 3c of the nickel plane 31 that is covered with the internal extension portion 33a, for example, the deterioration such as color change and the corrosion are suppressed. The chemical treatment may be chromating treatment or non-chromating treatment.

The anticorrosive layer 32 may alternatively be formed to cover the entire nickel plane 31. Forming the anticorrosive layer 32 while covering the entire part of the nickel plane 31 that is more on the inside of the exterior body 5 than the held portion 33c and not covering the other part thereof on the outside of the exterior body 5 makes it possible to not just suppress the deterioration and the corrosion but also reduce the cost.

When the battery is used for an electric vehicle, for example, the thickness of the anticorrosive layer 32 can be set in the range of 20 nm to 80 nm in consideration of securing the enough battery life (about 10 years of life).

The resin layer 33 satisfies the condition below. The resin layer 33 covers at least the held portion 33c of the surface of the anticorrosive layer 32, has the internal extension portion 33a extending from the held portion 33c to the inside of the exterior body 5, is held between the negative electrode terminal 3 and the exterior body 5, is heat-sealed to the negative electrode terminal 3 (anticorrosive layer 32 covering the nickel plane 31) and the exterior body 5, and can be sealed by the held portion 33c. Therefore, the resin layer 33 may be provided with, for example, an extension portion (hereinafter referred to as external extension portion) 33b extending from the held portion 33c to the outside of the exterior body 5.

The resin layer 33 can be formed of the resin with the heat resistance of such a degree that the resin is not crushed by being melted by desired heat (for example, 160° C. to 190° C.) and pressure (for example, 0.5 to 2.0 MPa), and with the resistance against the electrolyte solution (electrolyte solution resistance). Examples of such resins include acid-modified polyolefin resin.

In the case of using the acid-modified polyolefin resin, the resin may be selected in accordance with the type of resin used for the heat-sealing resin layer from among the resins that can heat-seal between the negative electrode terminal 3 and the exterior body 5. Specific examples of such resins include polyolefin resin graft-modified with unsaturated carboxylic acid, a copolymer of ethylene or propylene and acrylic acid or methacrylic acid, and metal cross-linked polyolefin resin. If necessary, 5% or more of the following may be added: a butene component, an ethylene-propylene-butene copolymer, an amorphous ethylene-propylene copolymer, a propylene-cc-olefin copolymer, an olefin-based elastomer, or the like.

The shape of the internal extension portion 33a of the resin layer 33 may be a shape extending from the held portion 33c to the inside of the exterior body 5. For example, if the dimension of the resin layer 33 in the inward-outward direction of the exterior body 5 is approximately 10 mm, the dimension of the internal extension portion 33a in the extension direction can be set in the range of 0.5 mm to 5 mm. If this dimension is less than 0.5 mm, the sufficient peeling strength cannot be achieved. If the dimension is less than 0.5 mm, for example, the position to be held by the bonding surface of the laminated film may be displaced in the heat-sealing of the resin layer 33. In this case, the laminated film deformed due to the step difference at the end of the internal extension portion 33a is heat-sealed to the held portion 33c (heat-sealed with the shape reflecting the step difference). This deteriorates the insulating properties of the exterior body 5. On the contrary, if the dimension is more than 5 mm, the volume efficiency of the battery is deteriorated.

The thin resin layer 33 may cause the metal layer in the exterior body 5 to be brought into contact with the terminal after the heat-sealing. In the example illustrated in FIGS. 1 and 2, the pair of terminals 2 and 3 is positioned side by side along one edge. Alternatively, the positive electrode terminal 2 may be positioned at one edge and the negative electrode terminal 3 may be positioned at the other edge.

Figure 5:
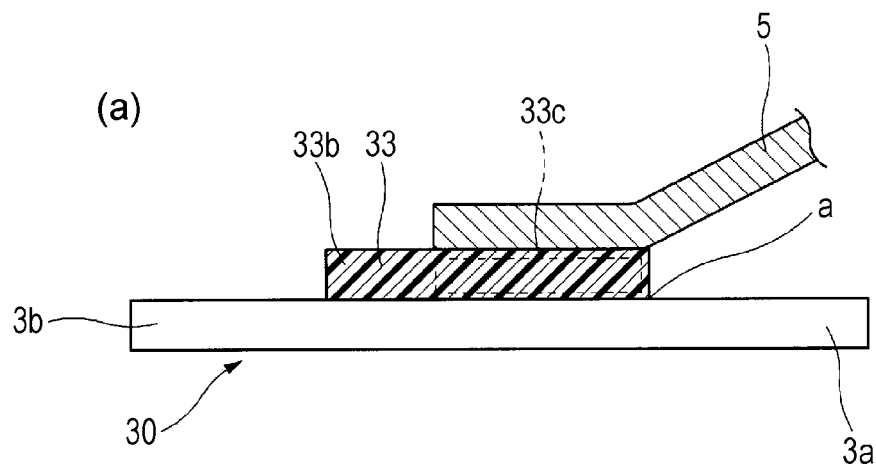
FIG. 5(a) is a schematic sectional view illustrating a secondary battery according to the known art and FIG. 5(b) is a schematic sectional view illustrating the secondary battery illustrated in FIG. 1 (where the anticorrosive layer and the nickel plane, etc. are not illustrated).
Figure 5:
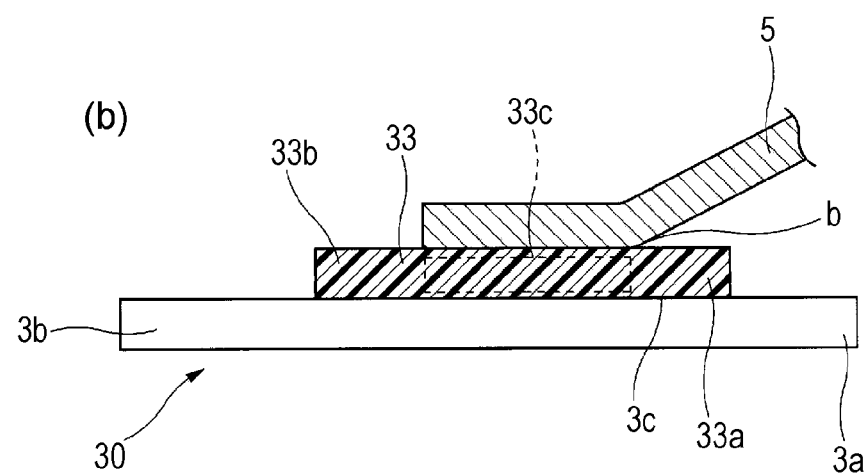

The secondary battery according to the embodiment of the present invention has a structure in which the resin layer covers at least the held portion of the surface of the anticorrosive layer and has the internal extension portion (corresponding to the internal extension portion 33a in FIG. 3). This anticorrosive layer is formed to cover a part that is more on the inside of the exterior body than the held portion. The internal extension portion extends from the held portion to the inside of the exterior body. In the structure illustrated in FIG. 5(a), which is similar to the component denoted by 306 in FIG. 13 of JP-A-2009-99527, the sealing is conducted without the formation of the internal extension portion 33a extending to the inside of the exterior body 5 from the held portion 33c held by the exterior body 5 of the surface of the terminal main body 30. In this structure, if the pressure inside the exterior body has increased, the peeling occurs starting from the point a in the exterior body. The point a corresponds to the bonded portion between the resin and the metal, at which the interface peeling occurs. On the other hand, in this embodiment, the sealing is conducted so that the resin layer 33 with the internal extension portion 33a extending to the inside of the exterior body 5 is formed as illustrated in FIG. 5(b). In this structure, the peeling starts from the point b, which corresponds to the bonded portion between the resin and the resin. The peeling that occurs here is resulted from the cohesive failure. Thus, the peeling strength is high as compared to the interface peeling.

Here, the surface (hereinafter, the extension portion covered surface) 3c of the nickel included in at least the surface side of the terminal main body 30 (corresponding to the nickel plane 31 in FIG. 2 and FIG. 3, hereinafter referred to as nickel plane), which is more on the inside of the exterior body than the held portion 33c and which is covered with the internal extension portion 33a, is not exposed directly to the electrolyte solution. Therefore, covering with the anticorrosive layer (corresponding to the anticorrosive layer 32 in FIGS. 2 and 3) seems unnecessary. It has been confirmed that, however, the structure without the anticorrosive layer in the extension portion covered surface 3c deteriorates (changes in color, for example) and corrodes over time more easily than the nickel plane having neither the held portion 33c nor the resin layer 33. On the other hand, in the secondary battery with the structure having the anticorrosive layer also formed on the extension portion covered surface 3c as described in this embodiment, there is no big difference in deterioration or corrosion in the extension portion covered surface 3c as a result of comparing with the nickel plane having neither the held portion 33c nor the resin layer 33.

According to the secondary battery with the structure as described in the present embodiment, the peeling strength in the held portion can be improved and the deterioration of the nickel plane of the terminal can be suppressed. This can provide the secondary battery with reliability and the present invention can provide the effective operation.

Example of Electrolyte Solution

There is no particular limitation on the electrolyte solution. Examples of the electrolyte normally used for the lithium ion secondary battery include a nonaqueous electrolyte solution containing a lithium salt dissolved in an organic solvent. The electrolyte solution is not limited to the electrolyte solution in a liquid state. The electrolyte solution may be a half-solid electrolyte such as a gel-like electrolyte. The electrolyte solution may be in contact with the terminal.

In regard to the volume of electrolyte solution, if the exterior body 5 is sealed under reduced pressure, the proportion of the electrolyte solution relative to the total pore volume of the positive electrode plate 41, the negative electrode plate 42, and the separator 43 (liquid volume coefficient) may be more than 1, more specifically may be 1.1 to 1.6. When the proportion of the electrolyte solution is 1.1 or more, a space is formed between the internal extension portion 33a and the laminated film. In this case, a reservoir of the electrolyte solution can be formed in that space. When the proportion is less than 1.1, the space between the internal extension portion 33a and the laminated film is small. In this case, the nickel plane 31 of the extension portion covered surface 3c corrodes quickly.

For collecting easily the electrolyte solution in the place around the internal extension portion 33a, for example, the thickness of the bonded portion of the tip portion 40a of the extension portion 40 with the negative electrode terminal 3 is increased to be larger than the thickness of the internal extension portion 33a. For example, in the case of the ultrasonic bonding, the welded portion becomes uneven. Thus, when the thickness is larger than that of the internal extension portion 33a, the space between the internal extension portion 33a and the laminated film easily becomes large.

In the case of using a plurality of secondary batteries as a battery pack, the secondary batteries are stacked in a direction orthogonal to the main plane of the exterior body 5 (i.e., in a direction where the positive electrode plate, etc. are stacked) and put into a can, and the secondary batteries stacked in the direction orthogonal to the main plane of the exterior body 5 are pressed and fixed. In this case, the electrolyte solution is moved to the periphery of the power generation element 4 (in a direction perpendicular to the stacking direction) due to the pressing force. This enables the electrolyte solution to be supplied easily to the space between the internal extension portion 33a and the laminated film.

Example of Fabrication Procedure

A fabrication procedure for the lithium ion secondary battery 1 is as below, for example. First, the negative electrode plate 42, the separator 43, the positive electrode plate 41, and the separator 43 are sequentially stacked, thereby forming the power generation element 4. Next, the internal end (one end 3a) of the negative electrode terminal 3, to which the resin layer 33 is heat-sealed in advance, is bonded to the extension portion 40 of the negative electrode current collector 42a of the negative electrode plate 42. Similarly, the internal end (corresponding to one end 3a of the negative electrode terminal 3) of the positive electrode terminal 2, to which the resin layer 33 is heat-sealed in advance, is bonded to the extension portion 40 of the positive electrode current collector 41a of the positive electrode plate 41. Next, in the state that the power generation element 4 is covered with the laminated film, the four sides of the laminated film (in the case of the two-fold laminated film, three sides) are heat-sealed while leaving a relatively small filling port.

Through the filling port, the inside of the exterior body 5 is filled with the electrolyte solution. The pressure in the exterior body 5 is reduced. After that, the filling port is heat-sealed, thereby sealing the exterior body 5. This completes the lithium ion secondary battery 1.

Example

Next, the lithium ion secondary battery 1 as illustrated in FIGS. 1 to 3 was fabricated under the condition shown below in accordance with the above description (the structure example of the secondary battery, the example of the terminals, the example of the electrolyte solution, and the example of the fabrication procedure). First, an aluminum terminal was prepared as the positive electrode terminal 2. A terminal including the terminal main body 30, the anticorrosive layer 32, and the resin layer 33 containing polypropylene was used as the negative electrode terminal 3. The terminal main body 30 has the nickel plane 31 formed by plating a surface of a rectangular and thin copper plate with nickel. The anticorrosive layer 32 is formed covering the nickel plane 31. The resin layer 33 covers the held portion 33c of the surface of the anticorrosive layer 32 and has the internal extension portion 33a extending by 3 mm from the held portion 33c to the inside of the exterior body 5. As the exterior body 5, the film including the laminated film with the three-layer structure was used.

The electrolyte solution including $LiPF_6$ and the mixed solvent of ethylene carbonate and diethyl carbonate was housed in the exterior body 5 together with the power generation element 4; thus, the secondary battery with the structure as illustrated in FIG. 1 to FIG. 3 was fabricated.

In the secondary battery with the improved peeling strength, the deterioration and corrosion of the nickel plane 31 including the extension portion covered surface 3c were suppressed. This has enabled the battery to have a longer life.

The aging test was conducted by the exposure to the electrolyte solution containing water for 98 hours at 65° C. under the conditions: the internal extension portion 33a and the laminated film of the exterior body 5 were in close contact; and the internal extension portion 33a and the laminated film of the exterior body 5 were not in close contact (the electrolyte solution was maintained between the laminated film and the internal extension portion 33a).

Evaluating the extension portion covered surface 3c later has proved that the close contact leads to the quick deterioration.

Figure 4:
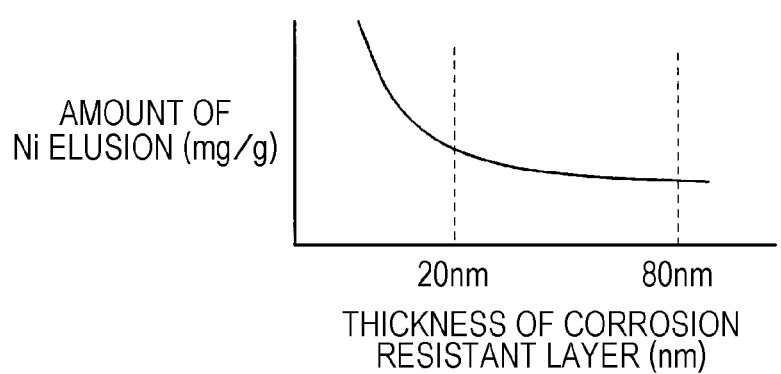
FIG. 4 is a graph schematically expressing the characteristic of the elusion amount of the nickel plane relative to the thickness of the anticorrosive layer of the terminal.

On the other hand, the secondary batteries were fabricated by changing the thickness of the anticorrosive layer 32 variously. With the use of these batteries, the amount of nickel elusion was observed. As shown in FIG. 4, the amount of nickel elusion changes relative to the thickness of the anticorrosive layer.

These results indicate that, as shown in FIG. 4, the amount of nickel elusion decreases as the thickness of the anticorrosive layer 32 is increased. It has been confirmed that, if the thickness of the anticorrosive layer 32 is set to 20 nm or more, for example, a lifetime of 10 years or more is assured. Moreover, it has been confirmed that, in consideration of the welding strength between the terminal 3 and the extension portion 40, the thickness of the anticorrosive layer 32 is preferably set to 80 nm or less.

Example of the present invention has been described. Example above, however, merely corresponds to one example of the embodiment of the present invention. Example does not mean that the technical range of the present invention is limited by the specific structure of the above embodiment.

The invention claimed is:

1. A flat secondary battery comprising:
a power generation element including a positive electrode plate and a negative electrode plate stacked with a separator interposed between the plates;
an exterior body housing the power generation element and an electrolyte solution together and sealed by a laminated film having a resin layer stacked on at least an inner surface of a metal layer; and
a terminal having one end connected to the power generation element and the other end led out of the exterior body, held by the exterior body between the one end and the other end, and having a held portion, which is held by the exterior body, being sealed, wherein
the terminal includes a terminal main body including a nickel plane on a surface thereof, an anticorrosive layer covering at least a part of the nickel plane that is more on the inside of the exterior body than a held portion, and a resin layer covering at least the held portion of a surface of the anticorrosive layer and having an internal extension portion extending from the held portion to the inside of the exterior body, and
the held portion is sealed by heat-sealing the resin layer and the resin layer on an inner surface of the exterior body.

2. The secondary battery according to claim 1, wherein the internal extension portion extends from the held portion to the inside of the exterior body by 0.5 mm to 5 mm.

3. The secondary battery according to claim 2, wherein the exterior body is sealed under reduced pressure and a liquid volume coefficient of the electrolyte solution is 1.1 to 1.6.

4. The secondary battery according to claim 3, wherein the power generation element and the terminal are bonded to each other through a connection portion interposed between the power generation element and the terminal, and
the thickness of bonded portion of the connection portion after the bonding is larger than the thickness of the internal extension portion.

5. The secondary battery according to claim 2, wherein the power generation element and the terminal are bonded to each other through a connection portion interposed between the power generation element and the terminal, and
the thickness of bonded portion of the connection portion after the bonding is larger than the thickness of the internal extension portion.

6. The secondary battery according to claim 1, wherein the exterior body is sealed under reduced pressure and a liquid volume coefficient of the electrolyte solution is 1.1 to 1.6.

7. The secondary battery according to claim 6, wherein the power generation element and the terminal are bonded to each other through a connection portion interposed between the power generation element and the terminal, and
the thickness of bonded portion of the connection portion after the bonding is larger than the thickness of the internal extension portion.

8. The secondary battery according to claim 1, wherein the power generation element and the terminal are bonded to each other through a connection portion interposed between the power generation element and the terminal, and
the thickness of bonded portion of the connection portion after the bonding is larger than the thickness of the internal extension portion.

9. The secondary battery according to claim 1, wherein the anticorrosive layer has a thickness of 20 nm to 80 nm.

10. The secondary battery according to claim 1, wherein the terminal includes a positive electrode terminal bonded to a positive electrode current collector included in the positive electrode plate, and a negative electrode terminal bonded to a negative electrode current collector included in the negative electrode plate,
a terminal main body of the negative electrode terminal has a nickel plane on a surface of copper,
a part of the nickel plane that is more on the inside of the exterior body than the internal extension portion is covered with the anticorrosive layer, and
the negative electrode terminal is bonded to the negative electrode current collector with ultrasonic waves.

11. A flat secondary battery comprising:
a power generation element including a positive electrode plate and a negative electrode plate stacked with a separator interposed between the plates;
an exterior body housing the power generation element and an electrolyte solution together and sealed by a laminated film having a resin layer stacked on at least an inner surface of a metal layer;
a terminal having one end connected to the power generation element and the other end led out of the exterior body, held by the exterior body between the one end and the other end, and having the held portion sealed, wherein
the terminal includes a terminal main body including a nickel plane on at least a surface of the terminal main body, an anticorrosive layer covering the nickel plane, and a resin layer having an internal extension portion extending to the inside of the exterior body from the held portion and heat-sealed to the anticorrosive layer, and
the held portion is sealed by heat-sealing the resin layer and the resin layer on the inner surface of the exterior body.

12. The secondary battery according to claim 11, wherein the internal extension portion extends from the held portion to the inside of the exterior body by 0.5 mm to 5 mm.

13. The secondary battery according to claim 12, wherein the exterior body is sealed under reduced pressure and a liquid volume coefficient of the electrolyte solution is 1.1 to 1.6.

14. The secondary battery according to claim 13, wherein
the power generation element and the terminal are bonded to each other through a connection portion interposed between the power generation element and the terminal, and
the thickness of bonded portion of the connection portion after the bonding is larger than the thickness of the internal extension portion.

15. The secondary battery according to claim 12, wherein
the power generation element and the terminal are bonded to each other through a connection portion interposed between the power generation element and the terminal, and
the thickness of bonded portion of the connection portion after the bonding is larger than the thickness of the internal extension portion.

16. The secondary battery according to claim 11, wherein the exterior body is sealed under reduced pressure and a liquid volume coefficient of the electrolyte solution is 1.1 to 1.6.

17. The secondary battery according to claim 16, wherein
the power generation element and the terminal are bonded to each other through a connection portion interposed between the power generation element and the terminal, and
the thickness of bonded portion of the connection portion after the bonding is larger than the thickness of the internal extension portion.

18. The secondary battery according to claim 11, wherein
the power generation element and the terminal are bonded to each other through a connection portion interposed between the power generation element and the terminal, and
the thickness of bonded portion of the connection portion after the bonding is larger than the thickness of the internal extension portion.

19. The secondary battery according to claim 11, wherein the anticorrosive layer has a thickness of 20 nm to 80 nm.

20. The secondary battery according to claim 11, wherein
the terminal includes a positive electrode terminal bonded to a positive electrode current collector included in the positive electrode plate, and a negative electrode terminal bonded to a negative electrode current collector included in the negative electrode plate,
a terminal main body of the negative electrode terminal has a nickel plane on a surface of copper,
a part of the nickel plane that is more on the inside of the exterior body than the internal extension portion is covered with the anticorrosive layer, and
the negative electrode terminal is bonded to the negative electrode current collector with ultrasonic waves.

* * * * *